2,941,890
DENTAL STONE OR PLASTER

Paul I. Zandberg and Harry Leonard Diamond, Los Angeles, Calif.; said Diamond assignor to said Zandberg No Drawing. Filed July 1, 1958, Ser. No. 745,810

2 Claims. (Cl. 106—38.3)

The present invention relates to dental stone or plaster.

Dental stone or plaster, as it is sometimes termed, is used for a variety of purposes, such as for the making of a denture, and we shall not attempt, in the following specification, to detail all uses for such a material.

An object of the invention is the production of a dental stone or plaster which is capable of producing results superior to dental stones or plasters presently available on the market and known to the inventors, in that the present stone or plaster of the invention may be cured in a minimum of time.

With reference to the foregoing object, it may be stated that the stone or plaster of the invention produces an immediate over-all "cure" throughout its mass when heated in, for instance, an infra red oven, and is superior in point of time when boiling water is used, in that it is approximately four times faster in the curing process than known dental stone and plaster.

A further object is the provision of a dental stone or plaster which is easily handled by the technician at room temperature, is substantially free from air bubbles after spatulation, has low linear expansion and high impact and tensile strength.

In forming the dental stone or plaster of the invention, we make use of a metal powder which has high heat conductivity, such as aluminum powder. This aluminum powder is preferably of 325 or greater mesh, and is combined with what is known as "Hydrocal" dental stone and "Tamol," preferably having the same mesh as the aluminum powder. Hydrocal is an alpha gypsum and is substantially non-porous with the result that the gauging of water is considerably reduced and the material sets to a very strong and hardened mass. Hydrocal is a calcium sulphate which may also include fractions of Rochelle salt, pigment and a retarder, such as sodium citrate suspended in silica. "Tamol" is a neutral sodium salt of a condensed aryl sulphonic acid. Tamol is characterized in that it has low surface tension and interfacial tension, and frothing and foaming are not encountered in milling, grinding and mixing operations, where this material is used as the sole dispersing agent. Furthermore, "Tamol" reduces the viscosity of water dispersions and will convert a stiff paste and moist masses to the consistency of a free-flowing liquid.

To form our improved dental stone or plaster, we combine, by weight, as follows:

| | Percent |
|---|---|
| Hydrocal | 99.29 |
| Aluminum powder | 0.37 |
| Tamol | 0.34 |
| | 100.00 |

The composition above set forth is placed in a mill, preferably one of the type which has inside blades, and the material is thoroughly mixed. Thereafter, the material is stored in suitable containers or sacks for future use.

When the technician is ready to use the dental stone or plaster of the present invention, 4 parts of the material is mixed preferably with 1½ parts of water, and thoroughly spatulated in a rubber bowl. After spatulation, the material is poured into the impression in the usual manner. Curing follows, and with the present stone or plaster, when heat is applied thereto, the heat is immediately conducted throughout the stone or plaster to produce substantially an immediate cure, thus effecting a saving of time in its use. Ordinary plaster or stone cures slowly from the outside surface inwardly to the core. By tests, we have determined that ordinary plaster or stone at room temperature of 70° F. will, when placed in an oven, increase in temperature to 85° in three minutes and to 120° in five minutes. With the plaster or stone of our composition on the same basis, the temperature will rise to 120° the first three minutes and to 155° in five minutes.

Tests have shown that the cured stone or plaster of the invention has a tensile strength in pounds per square inch of 4559; a hardness on the Rockwell scale, H, using a ⅛" ball and a 60 kilogram load, of 66.30 and an Izod impact strength in pounds per inch of width of 66½. Further, the cured material has been found to have an observed linear expansion in inches of .0009.

The present chemical composition of the invention results in an ideal modeling or casting material for the reason that it sets rapidly to a strong, hard mass, and yet is easy to manipulate, either mechanically or manually. It has a mixing consistency that permits it to be flowed into all parts of an impression easily, with the reproduction of the minutest details. The material neither contracts nor expands appreciably while setting, and after setting, it does not warp or change its shape, and further does not lose its strength when subjected to vulcanization or other curing or molding methods, and lastly, it may be cured at an accelerated rate either in hot water or in an infra red oven.

We claim:

1. A dental stone composition consisting essentially of, a homogeneous mass of 0.37% by weight of aluminum powder, 99.29% by weight of alpha gypsum powder, and 0.34% by weight of a neutral sodium salt of a condensed aryl sulphonic acid powder.

2. The dental stone composition of claim 1: the homogeneous mass having a particle size of not less than —325 mesh.

References Cited in the file of this patent

UNITED STATES PATENTS

| | | |
|---|---|---|
| 1,357,375 | Baer | Nov. 2, 1920 |
| 1,863,591 | Crowell | June 21, 1932 |
| 2,241,604 | Knibbs | May 13, 1941 |
| 2,605,191 | Ingram et al. | July 29, 1952 |
| 2,754,220 | Gardner | July 10, 1956 |
| 2,887,392 | Lolley | May 19, 1959 |

OTHER REFERENCES

Edwards: "Aluminum Bronze Powder and Aluminum Paint," pub. 1927 by Chemical Catalog Co., N.Y.C.